Feb. 24, 1942. J. F. RAYNOLDS Re. 22,041

MULTICYLINDER PRESSING MACHINE

Original Filed Dec. 13, 1939 5 Sheets-Sheet 1

INVENTOR
JOHN F. RAYNOLDS
By Paul, Paul & Moore
ATTORNEYS

MULTICYLINDER PRESSING MACHINE

Original Filed Dec. 13, 1939 5 Sheets-Sheet 2

INVENTOR
JOHN F. RAYNOLDS
By Paul, Paul & Moore
ATTORNEYS

Feb. 24, 1942. J. F. RAYNOLDS Re. 22,041

MULTICYLINDER PRESSING MACHINE

Original Filed Dec. 13, 1939 5 Sheets-Sheet 3

INVENTOR
JOHN F. RAYNOLDS
By Paul, Paul & Moore
ATTORNEYS

Feb. 24, 1942. J. F. RAYNOLDS Re. 22,041

MULTICYLINDER PRESSING MACHINE

Original Filed Dec. 13, 1939 5 Sheets-Sheet 4

INVENTOR
JOHN F. RAYNOLDS
By Paul, Paul & Moore
ATTORNEYS

Feb. 24, 1942. J. F. RAYNOLDS Re. 22,041

MULTICYLINDER PRESSING MACHINE

Original Filed Dec. 13, 1939 5 Sheets-Sheet 5

INVENTOR
JOHN F. RAYNOLDS

By Paul, Paul & Moore
ATTORNEYS

Reissued Feb. 24, 1942

Re. 22,041

UNITED STATES PATENT OFFICE 22,041

MULTICYLINDER PRESSING MACHINE

John F. Raynolds, Minneapolis, Minn., assignor to The Unipress Company, Incorporated, Minneapolis, Minn., a corporation of Minnesota Original No. 2,242,481, dated May 20, 1941, Serial No. 309,016, December 13, 1939. Application for reissue October 10, 1941, Serial No. 414,500

6 Claims. (Cl. 38—41)

The present invention relates to garment or laundry presses of the multi-cylinder type and has for an object, the provision of a simple mechanical construction by which such presses may rapidly be moved toward closed position and thereafter squeezed under heavy pressure to complete the pressing operation.

It is a further object to provide a mechanism which will be economical in the use of compressed air.

It is a further object of the invention to provide a mechanism which will, during usage, automatically compensate for compression of the buck pad and variation of thickness of garments being pressed.

According to previous methods of operating multi-cylinder machines, it has been customary to close the presser head into or nearly into contact with the buck by means of a primary motor and then to apply power to a secondary motor which effects final closure and squeezing of the pressing head upon the buck. In such pressing machines, the application of power to the secondary motor has been accomplished by means of apparatus controlled by the operation of the press, that is to say, the application of power to the secondary motor has been carried out at a predetermined time after the press closing is initiated or at a predetermined position of the presser head with respect to the stationary buck. Such pressing machines have been subject to various objections.

According to the present invention the application of power in such a multi-cylinder press is made simultaneously to the primary motor and to the secondary motor, but the secondary motor is mechanically prevented from operating until the pressing head reaches a predetermined position near the buck, at which time the secondary motor is permitted to work and to move the presser head into final pressing engagement with the buck.

It is, accordingly, an object of the invention to provide an improved multi-cylinder pressing machine in which power is simultaneously applied to the primary and secondary motors.

It is a further object of the invention to provide an improved multi-cylinder pressing machine in which the secondary or squeezing motor is mechanically prevented from actuating until the press has been closed to a predetermined safe intermediate position by means of the primary motor notwithstanding the fact that power is simultaneously applied to both motors when the press closure is initiated.

It is a further object of the invention to provide an improved structural arrangement of parts which is simple and economical to manufacture and which may be assembled expeditiously.

It is a further object of the invention to provide an improved multi-motor pressing machine having a greatly reduced number of parts and having simplified, unified parts.

It is a further object of the invention to provide a system of controls whereby it is impossible for the operator of the press to become injured while operating the press.

Other objects of the invention are those inherent in the invention herein illustrated, described and claimed. These and other objects of the invention will become apparent in the description.

In the description hereinafter given, reference is made to the accompanying drawings in which like characters represent corresponding parts in all views.

Figures 4, 5, 6, 7:
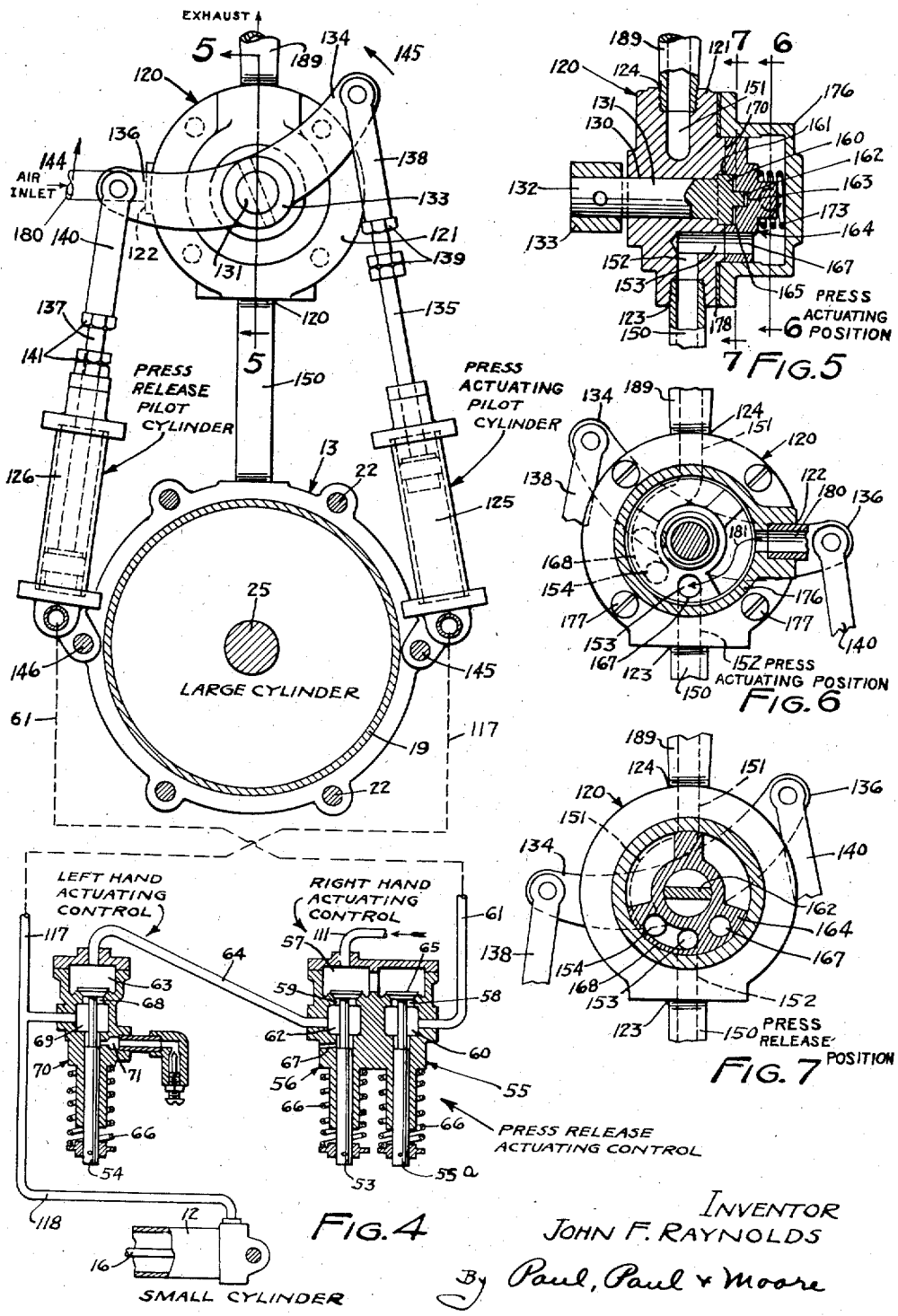

Figure 4 is a diagrammatic view showing certain of the parts in section or partly in section. The large or secondary motor of the pressing machine, together with a pneumatically operated relay valve for controlling the same, (shown in the upper part of Figure 4) are a fragmentary view partly in section along the line 4—4 of Figure 1, while the pipe circuits, operating valves (which are shown in section) and a fragmentary section of the small or primary motor of the assembly are exposed in diagrammatic relationship.

Figure 5 is a sectional view along line 5—5 of Figure 4.

Figure 6 is a sectional view along the line 6—6 of Figure 5 and illustrates the control valve of the secondary motor in the press-closed position.

Figure 7 is a sectional view along the line 7—7 of Figure 5 and illustrates the control valve of the secondary motor in the press-opened position.

Figure 8:
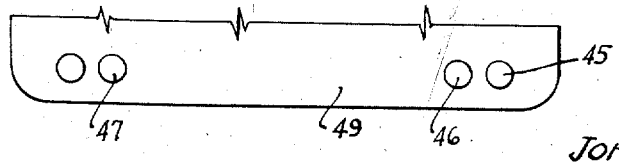

Figure 8 is a fragmentary view of the control buttons for operating the press.

Figure 9:
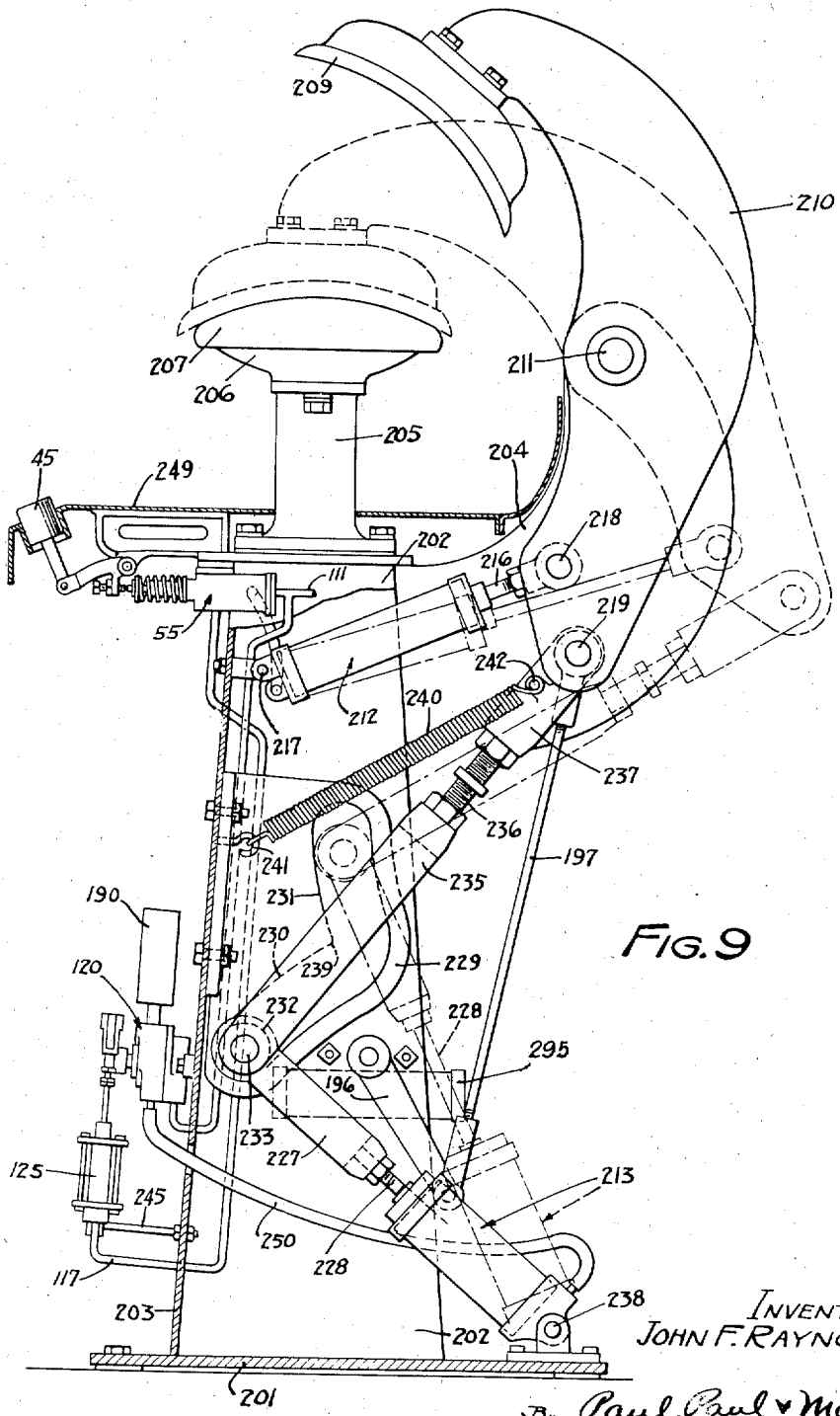

Figure 9 is a vertical view partly in section of a modified press embodying the present invention.

Throughout the drawings identical parts are designated by corresponding numerals.

Figure 1:
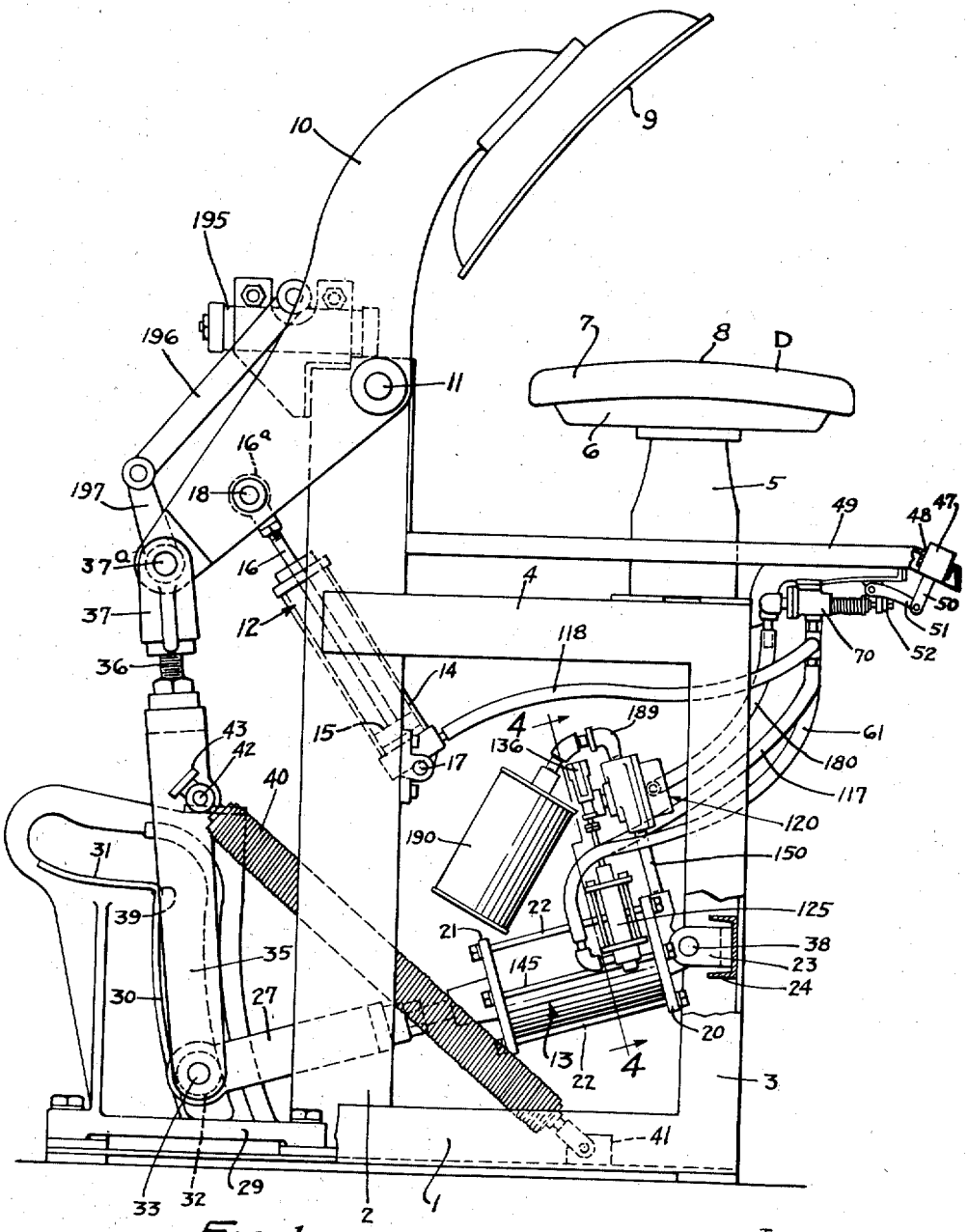
Figure 1 is a side elevational view, partly in section, of the pressing machine embodying the features and mechanisms of the present invention and showing the pressing machine in press-open position.
Figure 2:
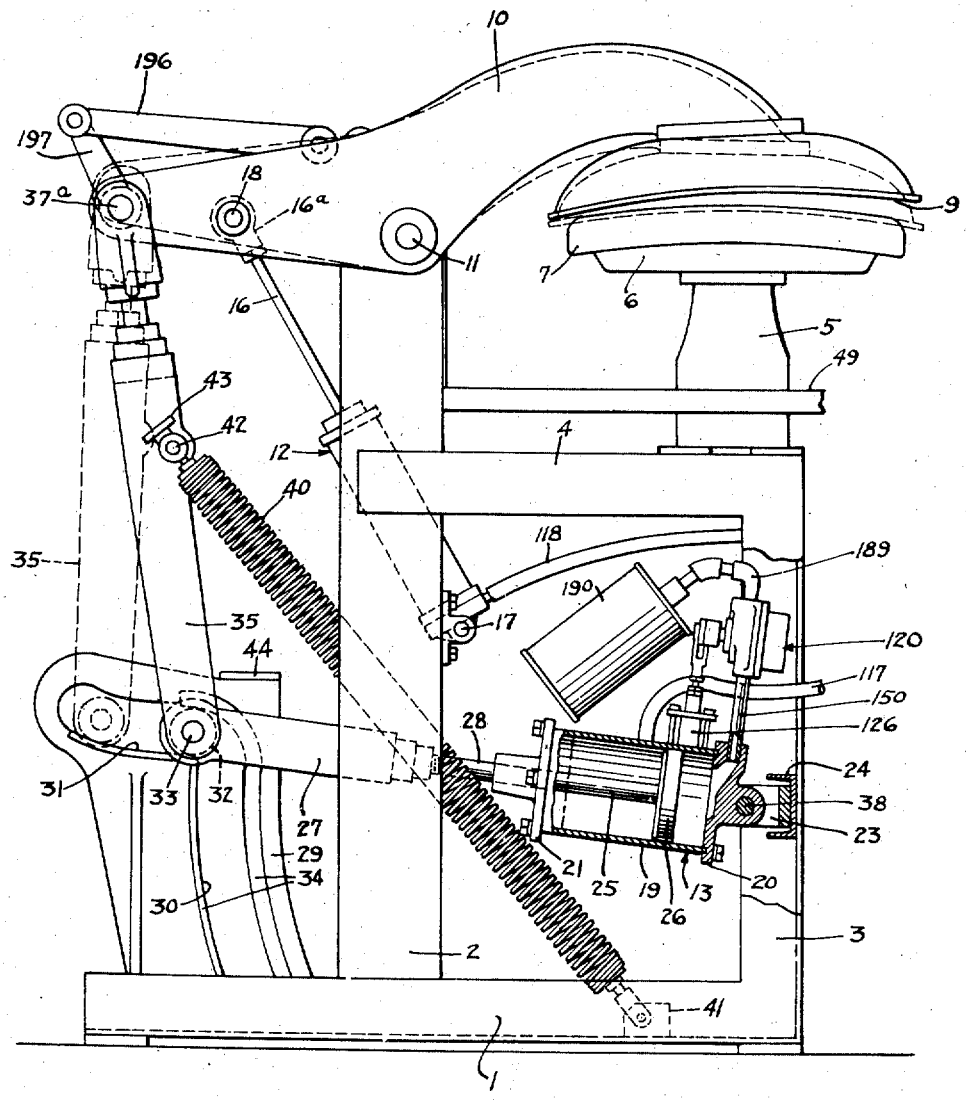
Figure 2 is a side elevation partly in section illustrating the features and mechanisms of the present invention and in full lines showing the press just as it is at the beginning of the squeezing operation.
Figure 3:
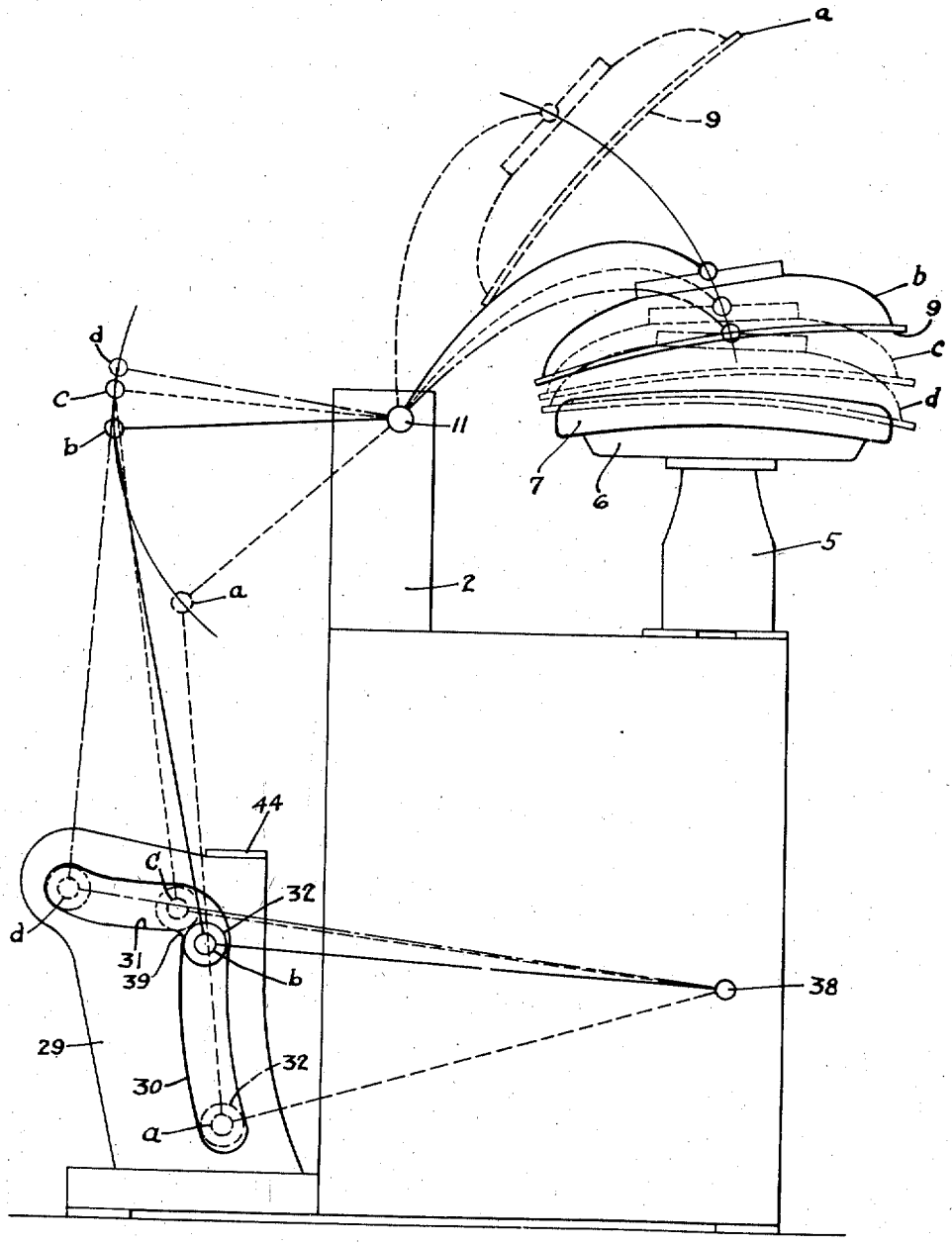
Figure 3 is a kinematic diagram showing the various pressing elements in a plurality of positions between the open position and the several closed positions.

The present invention is capable of being carried out in a variety of pressing machines, two of which are herein illustrated. Figures 1 through 3 show a heavy duty press capable of ironing large areas of material, whereas Figure 9 illustrates a light duty press, which is useful for various finishing operations. Figures 4 through 8 relate to details of the control mechanisms which are found alike in both presses.

The Heavy Duty Press

This embodiment of the present invention includes a main frame, preferably fabricated from structural shapes. The frame includes a bed frame member 1 upon which are mounted columns 2 and 3 and top frame member 4. Mounted upon the top frame 4 adjacent column 3 is a pedestal 5 which serves to carry stationary pressing buck 6 which is covered with a conventional buck pad 7. This pad may be of any desired construction such as a cotton-filled, cloth-covered pad, or a pad containing a large number of small springs or other resilient elements. While the details of the pad construction form no part of the present invention, it should be borne in mind that a buck pad as presently used, frequently consists of material which is loose and thick when fresh, but which material gradually becomes matted and takes a permanent set as it is used. This results in a gradually receding surface 8 upon which the cooperative movable pressing member 9 seats. The buck 7 may be heated by steam or electricity if desired.

The movable pressing element 9 is heated in any desired manner, such as by steam under pressure, or electrically, and is carried by a pressing arm 10 which is pivoted at point 11 at the upper end of column 2.

The operating mechanism of the press includes primary and secondary pneumatic motors generally designated 12 and 13 respectively. Primary motor 12 consists of a cylindrical shell 14 in which piston 15 and piston rod 16 move when air under pressure is admitted thereto. The lower end of primary motor 12 is pivoted to column 2 at point 17 and the piston rod is connected by means of clevis 16a at its upper end to pivot point 18 on presser arm 10 (as shown in Figures 1 and 2). It will be observed that in this construction, piston rod 16 acts directly upon the movable presser arm 10 to change its position from the open position shown in Figure 1 to the nearly closed position shown in the full lines of Figure 2.

The primary motor 12 moves the press from open position to a safe intermediate position which is nearly but not quite closed. In order to complete closure of the press and to apply heavy ironing pressure, there is provided a large secondary motor 13. The large secondary motor, generally designated 13, completes closure of the press and applies heavy pressure to the buck after the head 9 has been brought into close proximity to the buck through the preliminary action of primary motor 12. Secondary motor 13 consists of cylindrical member 19 which is held between cylinder heads 20 and 21 by means of through bolts 22. The cylinder head 20 is constructed so that it can be pivoted at point 38 upon bracket 23 which is in turn mounted upon channel 24. The latter is in turn carried by front columns 3 of the press. Piston rod 25 carries piston 26 in cylinder 19 and is provided at its outer end with a bifurcated member 27 which is adjustably mounted upon the threaded portion 28 of the rod. The bifurcated member 27 is shaped so as to straddle an upright bracket 29 which is shaped so as to form a cam trackway having an arcuate section 30 and a cam wedge section 31. A roller 32 is mounted by means of an anti-friction bearing upon journal pin 33 in the end of bifurcated member 27 and is of a size such that it neatly fits between the opposed surfaces of the trackway 30—31. It will be noted also that the ends of bifurcated member 27 are widened so as to slide against the side faces 34 of the trackway thereby to add stability to the mechanism.

Pin 33 extends beyond the outer surfaces of bifurcated member 27 and serves to join that member with a similar bifurcated member 35. Clevis 37 is adjustably attached to bifurcated member 35 by means of screw 36 so that the three members form a solid inextensible link, which may, however, be adjusted in length. No adjustment of the link is ordinarily necessary after the machine is initially assembled, and it is therefore considered as an inextensible link. The upper end 37 is pivoted to arm 10 at the point 37a.

The bracket 29, in which cam track 30—31 is formed, is mounted in fixed relationship with respect to the lower horizontal member 1 of the frame. The details of the cam track construction are illustrated in Figures 1, 2 and 3 which show the operation linkages in four illustrative positions *a*, *b*, *c* and *d*. The lower portion 30 of the cam track is an arc of a circle which has as its center the pivot pin 38 by which the base 20 of cylinder 19 is fixed to frame 3.

The surface 31 is a curved wedge having a gradually decreasing radius which results in an upturned end. It is to be understood, of course, that the portion 31 need not be exactly circular, but may be of any gradually rising curve. The wedge portion may be varied in different presses to accommodate the various compressibilities of buck pads, but in any design the wedge is made of rising configuration such that as roller 32 is forced outwardly on the arcuate wedge 31, the pressing head 9 will be forced downwardly upon buck pad 7 with heavy pressure.

The two portions 30 and 31 of the cam slot are joined together by a transition curve 39 of relatively short radius, and the length of the arcuate portion 30 and position of the transition curve 39 are made such that the large cylinder 13 is prevented from operating until the presser head 9 has reached a safe position sufficiently close to the buck 7 that the operator of the machine is precluded from moving her hands from the controls to any point between the presser head 9 and the buck 7. The transition curve 39 preferably has a comparatively short radius and the roller 32 is likewise made of comparatively small diameter in order that the transition between curves 30 and 31 may be comparatively abrupt.

The open press position is designated *a* in Figure 3, while the beginning of transition curve 39 is designated *b*. The transition curve extends to position *c* which is also the beginning of the arcuate wedge portion 31 of the cam slot. This latter portion 31 continues outwardly to position *d* which represents the limit of press movement achieved when the buck pad is worn and matted after long use.

By making the radius of curve 39 short and the diameter of roller 32 small, the presser head may be maintained under the exclusive control of the primary motor from position *a* until the press has closed to position *b*, at which position, head 9 is a very short or "safe" distance from the buck 7. Accordingly should the operator release the controls prior to the time that roller 32 reaches transition curve 39 (position *b*), the press will return to open position under the influence of the opening springs, notwithstanding air under pressure is applied to secondary motor 13.

The press is provided with a pair of springs 40, one on each side of link 35. The springs 40 are pivotally attached to a bracket 41 mounted in the base and are pivotally attached to a through rod 42 which is mounted upon the link 35. If desired, an adjustment screw 43 may be provided so as to vary the tension of each of the springs 40.

As explained above, the springs serve to move the press from closed to open position and to return the press to open position from any intermediate position. A rubber or leather pad 44 is provided upon the top part of cam frame 29. Pad 44 provides a seat for spring attachment pivot 42 and cushions the opening of the press.

A pilot valve generally designated 120 is mounted upon cylinder 13 and consists of a valve body 121 having an air inlet port 122 and an air outlet port 123 and an exhaust port 124. The valve body has a transverse bore 130 which receives an operating shaft 131. To the outwardly extending end 132 of operating shaft 131, there is attached an operating lever 133 having arms 134 and 136. The valve operating arm 134 is connected to a piston rod 135 of pilot cylinder 125 by means of a clevis 138 which may be adjusted with reference to the piston rod 135 by means of lock nuts 139. The valve operating arm 136 is connected to the piston rod 137 of pilot cylinder 126 by means of a clevis 140 and is likewise adjustable by means of lock nuts 141.

The valve 120 is preferably mounted directly upon cylinder 13 by means of a short pipe nipple 150, which thus not only serves to connect the port 123 of the valve 120 to cylinder 13, but also mechanically to support the valve 120.

The pilot cylinder 125 is mounted upon the tie rod 145 of cylinder 13 while pilot cylinder 126 is likewise similarly mounted on the opposite side of cylinder 13 by means of tie rod 146.

When air is admitted to the pilot cylinder 126, piston rod 137 will be thrust outwardly and will move the arm 136 upwardly in the direction of arrow 144 (Figure 4) and when air is admitted to the pilot cylinder 125, the arm 135 will be moved upwardly in the direction of arrow 145.

The pistons of pilot cylinders 125 and 126 are preferably made of graphite-brass composition so as to be self-lubricating. They are machined so as to provide a clearance of about .010 inch and there is accordingly a slight air leakage around them so that when either cylinder is operated (with consequent movement of the piston in the other cylinder) will not compress the air in that cylinder for more than a short interval of time. The slight air leakage around the piston of the operating cylinder is inconsequential.

The valve body 121 is provided with a passageway 151 which connects the exhaust port 124 to a port 154 in the face of the valve body and is provided with another passageway 152, which terminates in the second port 153 in the face of the valve body. As will be explained below, port 124 is an exhaust port and port 123 is the outlet. The operating shaft 131 of valve 120 is provided with an inner circular head 160 which seats within a circular recess 161 in the right hand side of the valve body as shown in Figure 5. The circular head 160 is provided with a transverse key 162 which fits in a keyway 163 of a valve element generally designated 164. The valve element 164 has a configuration such as that shown in Figures 5, 6 and 7 and is provided with circular recess 165 into which the head 160 of the operating shaft fits. At the base of the recess 165 there is formed the keyway 163 previously mentioned. Element 164 is provided with a through passageway 167 and with a cutout portion 168 on the under side thereof.

Surface 170 of the valve element is lapped smooth and operates upon a corresponding lapped surface of the valve body. Element 164 is pressed in close engagement of the valve body by means of a spring 173 which is compressed against the valve element 164 by means of cap 176. Cap 176 is held on the valve body by means of a plurality of screws 177, and a gasket 178 is preferably provided so as to make an airtight joint between the valve cap 176 and body 121.

It will be noted there is a space between the upper surface of the shaft head 165 and key 162 respectively and the recesses of the valve element 164 into which these portions of the shaft project. As a result spring 173 is free to press the valve element 164 into close engagement into the valve body but at the same time the shaft and element are operatively connected so that as the former is rotated the latter will be likewise rotated.

The valve 120 has sufficient internal friction that it remains in the position into which it is actuated by means of the lever arms 134 and 136, and their cooperating pilot cylinders 125 and 126.

When the valve 120 is in the position shown in Figures 5 and 6, as occurs when press actuating pilot cylinder 125 is or has been actuated, the valve element 164 is moved to a position such that port 167 of the valve element is in alignment with port 153 of the valve body. As a consequence, air under pressure is admitted through supply pipe 180 and travels in the direction of arrow 181 through passageway 167 of the valve element 164, and passageway 153 of the valve body 121 to pipe nipple 150 and thence to the interior of the large cylinder 13.

When the valve is in the position shown in Figure 7 as occurs when the release pilot cylinder 126 is or has been operated, the arcuate recess 168 of the valve element 164 is positioned such that a communicating channel is afforded from port 153 through the arcuate under slot 168 and thence into port 154 and through passageway 151. Passageway 151 terminates at exhaust port 124.

In the preferred construction, the exhaust muffler 190 is mounted directly upon the pipe 189 which is screwed into the exhaust port 124 of valve 120.

The manual controls of the press shown in Figure 8 consist of a plurality of manually operated buttons 45, 46 and 47 which are slidably mounted in openings 48 in the table panel 49 of the press. Button 45 is the release button and when actuated serves to consummate the opening of the press. Buttons 46 and 47 are identical with button 45 and are respectively the right hand and the left hand operating controls. The buttons 46 and 47 are arranged so that each controls an air supply valve and as explained below the valves are coupled in series so that each of the buttons 46 and 47 must be in operated position in order to initiate closing of the press.

The operating connection between the buttons 45, 46 and 47 in their corresponding valves 55, 56 and 70 are identical and the description of button 47 and its connection to left hand control valve 70 will thus be representative of all of the controls used. As shown in Figure 1, button 47 is of comparatively large diameter and is slidably mounted in opening 48 in the table 49. At the lower end of button 47 there is a stem 50 which is pivotally connected to the rocker arm 51 mounted on the underside of table 49. The rocker arm is provided with an adjustment screw 52 which abuts against the stem of the left hand control valve 70.

In Figure 4 the control operating circuits and the interior construction of the control valves are diagrammatically illustrated. Release button 45 operates release valve 55 which is contained in the same casing at the right hand control valve 56 (which is operated by button 46). The left hand control valve 70 is contained in a separate casing and is operated by the left hand control button 47.

The combined release and right hand control valve casing has an antrum chamber 57, which is provided with valve port 58 of release valve 55 and valve port 59 of the right hand control valve 56. The release valve has stem 55a having a head 65, and the entire valve is biased to the closed position by means of valve spring 66. The right hand control valve is similar and has a stem 53. This valve is likewise biased to the closed position by spring 66. The combined release and right hand control valve casing is provided with a cover plate for antrum chamber 57 to which there is connected an air pressure supply line 111 which serves to maintain air under pressure at all times in the antrum chamber 57.

Adjoining valve port 58, there is a secondary chamber 60 which is connected by tube 61 to pilot cylinder 126 previously described. Adjacent the valve port 59 of the right hand valve there is a chamber 62 which is connected with tube 64 to the chamber 63 of the left hand control valve.

The left hand control valve is provided with a casing having valve port 68 that is normally closed by a valve 54. Like valves 55a and 53, valve 54 is biased to the closed position by spring 66. The valve port 68 communicates with chamber 69 which is connected with tube 117 to the pilot cylinder 125 of valve 120. The tube 117 has a branch 118 which is connected directly to the primary motor 12.

It will be noted that a portion of the valve stems 53 and 54 adjoining heads of the valves is of reduced diameter and the junctions between the large and small portions of valve stems 53 and 54 form valves which serve to open and close small exhaust ports 67 and 71 respectively having a purpose to be described.

*Operation of heavy duty press*

Under normal conditions the press is in the open position shown in Figure 1 at which time the operating head 9 is held in an elevated position due to the action of springs 40. Under normal open press condition, the valve 120 is in the position shown in Figure 7. Air under pressure is supplied to chamber 57 of the combined release and right hand valves and is also supplied to the portion of valve 120 above the valve element 164 by means of tube 180.

In order to close the press, the operator operates the right hand control button 46 and the left hand control button 47. When this occurs, valve stems 53 and 54 are pressed inwardly against the action of their springs 66 and serve to open the passageway from the air pressure supply in antrum chamber 57 through valve port 59 to antrum chamber 62 of the right hand valve and thence through pipe 64 to the chamber 63 of the left hand valve. Since the left hand valve is also open at this time, air flows through valve port 68 and chamber 69 to pipe 117 and thence through pipe 118 to the primary motor 12. At the same time, air is supplied to the pilot cylinder 125 of valve 120 which is therefore simultaneously operated with the result that valve 120 is moved to the press actuating position shown in Figures 5 and 6 and air is supplied to secondary motor 13 even before the press has had an opportunity to close under the influence of primary motor 12. Air under pressure at pipe 180 accordingly flows through port 167 in valve element 164 and through port 153 to pipe 150 and thence to the secondary motor 13. Hence, upon actuation of the right and left hand valves, air is simultaneously supplied to both the cylinder of primary motor 12 and to the cylinder of secondary motor 13. It is obvious that in the action of supplying air to the primary and secondary cylinders 12 and 13, there is no attempt to "time" or delay the flow of air to high pressure cylinder 13, but on the contrary, the application of air is made simultaneously to both cylinders. Pilot cylinder 125 and valve 120 are rapidly operated, and air is in fact introduced into cylinder 13 simultaneously with the introduction into cylinder 12. Action of secondary motor 12 is however prevented because the arcuate section 30 of the cam slot precludes movement of the piston 28 in secondary motor 13 until the press head has moved to a "safe" position close to the buck.

Hence, when the buttons 46 and 47 are pressed, piston rod 16 of the primary motor is thrust outwardly but piston rod 25 of the secondary motor is held from moving.

The primary motor 12, however, is free to actuate and accordingly moves the presser arm 10 towards the closed press position against the opening influence of springs 40. Due to the action of primary motor 12 and piston rod 16 the pressing arm 10 moves from open press position *a* through the safe position *b*, at which time the presser head 9 is very close to the buck 7, and then through position *c*. Throughout this motion, the roller 32 is held in tight contact with the arcuate position 30 of the slot in bracket 29 due to the pressure being applied by secondary motor 13. As the roller 32 reaches the transition curve 39 (position *b*) piston 26 and piston rod 25 are permitted for the first time to operate and as they move outwardly the roller 32 rides upwardly on the arcuate wedging surface 31 and accordingly lifts link 35 which, due to its pivotal connection to the presser arm, exerts a heavy pressure between the presser head 9 and the buck 7.

The stopping position of the roller 32 along arcuate portion 31 of the cam trackway is determined by the air pressure in the cylinder 19, the force exerted by springs 40 and the resisting pressure of the buck pad 7. When the pad is fresh and thick, or when a heavy garment is in the press, the roller will cease movement at a position such as position *c* in Figure 3. In this position the presser head is in contact with the pad at level *c*. As the pad 7 is compressed during use, the surface is gradually lowered from *c* through intermediate stopping positions to the limiting position *d*. Thus the limiting positions of roller 32 will gradually shift from position *c* of Figure 3, which is the position when the pad is fresh, through intermediate positions, and then to position *d*, which is the position when the pad has been fully compressed in use and ready for replacement. Adjustment of the press to accommodate for the compression during the life of the pad is thereby rendered unnecessary, and by proper selection of the curve 31, the pressure of head 9 upon buck 7 is substantially the same through the range of compressions of the buck pad, and the same regardless of the thickness of the work being pressed.

This automatic adjustment feature also compensates for variations in the thickness of garments being pressed. It should be noted that adjusting screws on piston rod 25 and on link 35—36 need not be varied after the machine is assembled and balanced. The upward force exerted by link 35—36 increases slightly as the limiting position of roller 32 moves to the left, as shown in Figure 2, due to the fact that link 35—36 becomes nearer the right angle position with respect to presser arm 10, but this increase is counteracted by the increased tension in springs 40 and by the rising curvature of portion 31 of the slot. This results in a substantially constant pressure being exerted upon the pad whether it is new and thick, or compressed as after severe usage.

It will be noted that piston 26 is not moved in cylinder 19 of the secondary motor during the time the press is being opened or closed under the influence of the compressed air in motor 12 because section 30 of the cam track is the circumference of a circle, the center of which is pivot point 38. Thus as the pressing elements close upon each other, the roller 32, bifurcated member 27, piston rod 25, and secondary motor 13 simply oscillates upwardly without being extended, until the roller reaches the transition curve 39 of the trackway, even though there is heavy pressure between roller 32 and portion 30 of the slot in bracket 29.

When operating buttons 46 and 47 are released after the press is closed, the air in the cylinder of primary motor 12 is accordingly exhausted via pipes 118 and pipe 117, chamber 69 and port 71, which at this time is uncovered due to the movement of valve stem 54 to the release position, and thence to atmosphere. In the event the left hand button should be held down while the right hand button is released, the air from primary motor 12 is nevertheless exhausted from chamber 69, through port 68, tube 64, chamber 62 and port 67, which at this time is uncovered due to the movement of valve stem to the released position.

The press will remain closed under the influence of the heavy pressure of secondary motor 13 until release valve 55 is operated by pressure upon button 45. When this occurs, air is admitted from chamber 57 through valve port 58 to chamber 60 and thence through pipe 61 to pilot release cylinder 126, which serves to move the valve 120 to the position shown in Figure 7. When this occurs a passageway is completed from the cylinder 19 of secondary motor 13 through pipe 150 to port 153 and thence through arcuate section 168 in the under side of valve element 164 to port 154 and thence through passageway 151 to the exhaust port 124, exhaust pipe 189 and exhaust muffler 190. The air within cylinder 19 accordingly rushes outwardly through the exhaust muffler. As this occurs, spring 40 quickly moves the roller 32 downwardly along the arcuate wedge portion 31 in bracket 29 and thence around the transition curve 39 to the arcuate portion 30 to the open press position.

In the event the buttons 46 and 47 are operated, (with consequent substantially instantaneous operation of valve 120 which applies air to cylinder 19 of secondary motor 13) and are then released before the roller 32 has moved to the transition curve 39, the press will open under influence of springs 40 notwithstanding there is a heavy pressure exerted by secondary motor 13 between roller 32 and slot 30. The roller 32 is preferably journaled on needle roller bearings and the rolling resistance is therefore small, even though the pressure is heavy. Should the buttons 46 and 47 again be operated, the press will close quickly and smoothly even with the full force of roller 32 exerted upon arcuate portion 30 of the slot.

The movement of the press during opening and closing is preferably controlled by hydraulic shock absorber, generally designated 195 which may be of any approved type, preferably a variable resistance type. The hydraulic shock absorber 195 is provided with a lever arm 196 which is connected by means of links 197 to pivot 37a of the presser arm 10. In some instances, however, a second shock absorber may be coupled directly upon member 28.

*Construction of light duty press*

The press illustrated in Figure 9 is relatively small as compared to the press illustrated in Figures 1, 2 and 3, and is intended for the finishing of relatively small areas of garments and for the ironing of small pieces.

The frame of the light duty press consists of a bed plate 201, upon which there is mounted in vertical position an open back channel having a front portion 203 and side portions 202. The open back channel is preferably formed by bending a piece of relatively heavy gauge sheet metal into the desired channel shape. Near the upper portion of each of the side members 202 there is an upwardly and backwardly extending arm 204. The arms 204 serve to carry the pivot 211 upon which the presser arm 210 is mounted, and the presser arm carries a movable pressing head 209, which moves into and out of pressing engagement with buck 206. The buck 206 is carried upon a pedestal 205, which is in turn bolted to the upper portion of the channel 202—203 by means of bolts. The channel 202—203 is preferably attached to the bed plate 201 by welding.

The work table 249 is preferably of sheet metal and is likewise carried in fixed relationship upon the pressing machine, the outer portion of the table being provided with openings for the control buttons such as those shown in Figure 8. The buck 206 is provided with a buck pad 207 of resilient material which, as explained with reference to the heavy duty press, is gradually compressed during use.

Within the open back channel 202—203, there is positioned the primary or press closing motor generally designated 212, which is pivotally connected at 217 to the front portion 203 of the press frame channel. Primary motor 212 is provided with a piston and piston rod 216, which is pivotally connected by means of pivot pin 218 to the rearwardly extending portion of the presser arm 210. Adjacent the pivot 218 is the second pivot 219, to which an inextensible link 235 is connected after the manner described for the heavy duty press. A spring 240 is attached to the front portion 203 of the channel by means of an eye bolt 241 and is attached to the inextensible link 235 by means of a pivot connection 242. As in the heavy duty press, the inextensible link 235 is composed of a downwardly extending bifurcated member, which is connected by means of an adjustment screw 236 to an upper bifurcated member 237. The adjustment screw is locked in adjusted position by means of locking nuts thereon and ordinarily is not adjusted after the assembly of the apparatus has been completed.

Upon the bed plate 201, there is pivotally mounted at 238 a secondary motor generally designated 213, which is provided with a piston and piston rod 228. The piston rod has connected thereto a bifurcated member 227, which is pivotally connected at 233 to the bifurcated member 235 of the inextensible link. The pivot 233 consists of a through pin, which carries a roller 232 between the forks of bifurcated member 235. The roller 232 is preferably mounted upon anti-friction bearings such as needle roller bearings and is arranged to operate in a cam slot of bracket 229.

The cam bracket 229 is attached to the frame channel of the press by means of bolts and is provided with a cam slot composed of an arcuate section 230, which is formed about the pivot point 238 as a center, smoothly joined at curve 239 to a curved wedge portion 231. In Figure 9 the open press position is illustrated in full lines and the closed press position by dotted lines.

The movement of the press during opening and closing is preferably controlled, as in the heavy duty press, by means of a hydraulic shock absorber generally designated 125, which may be of any approved type, preferably of a variable resistance type. The hydraulic shock absorber 295 also in the light duty press is mounted upon one of the side plates 202, and is provided with a lever arm 196, which is positioned within the channel formed by the side plates and front plate 203 of the pressing frame. The lever arm 196 is connected by means of a link 197 to pivot 219 of the presser arm 210.

The operating controls of the light duty press illustrated in Figure 9 are identical with those of the heavy duty press illustrated in Figures 1, 2 and 3, the controls being the same as those shown in detail in Figures 4, 5, 6 and 7. In the light duty press of Figure 9, however, the rotary valve generally designated 120 is mounted upon the front portion 203 of the frame channel rather than directly upon the large operating cylinder as in the heavy duty press. As in the heavy duty press, the rotary valve 120 of the light duty press is arranged to be operated by a pair of pilot cylinders, one of which is illustrated at 125. The pilot cylinders are mounted upon pins 245, which are attached to the frame channel 203 of the press.

Above the rotary valve 120, there is mounted an exhaust muffler 190 and a flexible hose connection 250 is provided between the rotary valve and the large operating cylinder 213.

*Operation of the light duty press*

As in the heavy duty press, the pilot cylinders of which pilot cylinder 125 is visible in Figure 9 are arranged to be operated by a plurality of control buttons 45, 46 and 47, which are arranged to operate valves 55, 56 and 70 respectively. The actuation of the right and left-hand control buttons 46 and 47 respectively causes the actuation of valves 56 and 70 respectively, which in turn provides a flow of air from control line 111 through the actuated valves 56 and 70 to pipe 117 which causes the simultaneous actuation of the press actuating pilot cylinder 125 and the small press closing cylinder 212. Thus (as in the heavy duty press) the actuation of the right and left hand control valves 56 and 70 causes the simultaneous introduction of air into the cylinder of the primary motor 212 and into the cylinder of the secondary motor 213. The latter, however, is not permitted to operate due to the fact that roller 232 is in engagement with the arcuate portion 230 of the cam slot.

As the press 209 is brought to a position close to the buck 207 the roller 232 reaches the transition curve 239, and at this instant, the secondary motor 213 is for the first time permitted to operate. Due to the pressure in motor 213, piston rod 228 is extended longitudinally with the result that roller 232 is forced outwardly upon the curved wedging surface 231 and as a result the pressing head 209 is forced tightly into engagement with the buck 207.

When it is desired to open the press, the release button 45 is actuated which accordingly opens valve 55, and causes the introduction of air into the press release pilot cylinder 126. When this occurs, valve 120 is moved to the position shown in Figure 7, and the air then under pressure in the cylinder of secondary motor 213 is exhausted to atmosphere through muffler 190. The press accordingly opens under the influence of spring 240.

In both the light and heavy duty presses, it is sometimes desirable to provide a throttle valve in the air supply line of the secondary motor. Thus a thottling valve or orifice may be provided in pipe 250 or line 150 of the light and heavy duty presses respectively. The throttling valve or orifice does not inhibit the rapid building up of pressure in the secondary motor at the instant the press closure is initiated (since the volume of the cylinder space is then small), but over rapid movement of the secondary motor piston during final closure is inhibited.

The patent, of which this application is an application for reissue, is a continuation-in-part of my application Serial Number 182,452, filed December 30, 1937, now Patent Number 2,242,480.

It is obvious that many variations may be made in the details of the apparatus herein illustrated and described without departing from the spirit of the invention which is claimed.

What I claim is:

1. In a garment or laundry press, a frame, a presser arm pivoted intermediate its ends for oscillation with respect to said frame, a pair of cooperating pressing elements, one mounted on the frame and another on the arm, a link pivoted to said arm at a point removed from the pivot point of the arm on the frame, and a longitudinally extensible fluid motor, pivoted at one end to said frame and pivotally connected at the other end to said link, a cam surface for guiding the pivotal junction point of said link and said longitudinally extensible motor, comprising a segment of a circumference smoothly joined to a substantially arcuate wedge oriented so that motion of the junction point along said arcuate wedge moves the press toward closed position, motor means for moving the pivotal junction of said longitudinally extensible motor and said link along said cam surface, and two-hand control means for simultaneously applying power to said motor means to initiate closing action of the press and fluid pressure to the fluid motor to effect movement of said pivotal junction point along the cam to cause final closing of the press.

2. A pressing machine comprising a frame, a presser arm pivotally mounted on said frame, a first motor having a cylinder and piston for moving the presser arm toward press closed position, a second motor having a cylinder and piston, a pivot for mounting the cylinder of the second cylinder motor on the frame and a link directly connected between the presser arm and the second piston rod whereby the cylinder and piston rod will be moved about the cylinder pivot as a center when the presser arm is moved from open press position toward closed press position, and a cam guide including an arcuate segment oriented around the cylinder pivot point as a center for restraining outward movement of the piston rod throughout a portion of said press closing movement, a wedge segment formed to present a progressively increasing deviation towards the presser arm from a radius through the cylinder pivot, and two-hand operator controlled means for substantially simultaneously applying fluid pressure to the cylinders of both motors, to initiate closing of the press by action of the first motor and then apply final ironing pressure by action of the second motor.

3. A garment or laundry press comprising a frame, a presser arm pivoted intermediate its ends on said frame, a stationary pressing element mounted on the frame, a movable pressing element mounted on said presser arm for cooperating engagement with said stationary pressing element, a first longitudinally extensible fluid motor coupled between the frame and presser arm for actuating the latter, a second longitudinally extensible motor, pivot means for connecting one end of said second motor to the frame, an inextensible link having one of its ends pivotally connected to the presser arm and the other of its ends pivotally connected to the second motor, cam guide means for the pivotal connection between the inextensible link and the second motor, and two-hand operator controlled means for controlling flow of air to the first motor, and relay valve means operated when the two-hand operator controlled means is moved to cause actuation of the second fluid motor for effecting movement of said pivotal connection along the cam guide means for causing final closing of the press.

4. A garment or laundry press comprising a frame, a presser arm pivoted intermediate its ends on said frame, a stationary pressing element mounted on the frame, a movable pressing element mounted on said presser arm for cooperating engagement with said stationary pressing element, a first longitudinally extensible fluid motor coupled between the frame and presser arm for actuating the latter, a second longitudinally extensible motor, pivot means for connecting one end of said second motor to the frame, an inextensible link having one of its ends pivotally connected to the presser arm and the other of its ends pivotally connected to the second motor, cam guide means for the pivotal connection between the inextensible link and the second motor, operator controlled means for controlling flow of air to the second motor, a relay valve means having an air introducing position and an air exhaust position for controlling the flow of air to and from the second motor, a first relay fluid motor for moving the relay valve to the position for introducing air into the second motor, said first relay fluid motor being connected to the operator controlled means for operation simultaneously with the first fluid motor, a second relay fluid motor and operator controlled means for supplying air thereto for moving the relay valve to the position for exhausting air from the second fluid motor.

5. The combination set forth in claim 3 wherein the relay valve means is mounted on the second fluid motor.

6. The combination set forth in claim 4 wherein the relay valve means is mounted on the second fluid motor.

JOHN F. RAYNOLDS.